INVENTORS
NORMAN H. SANDERS, JR.
RAYMOND SANDERS
BY
ATTORNEY ated Apr. 1, 1969

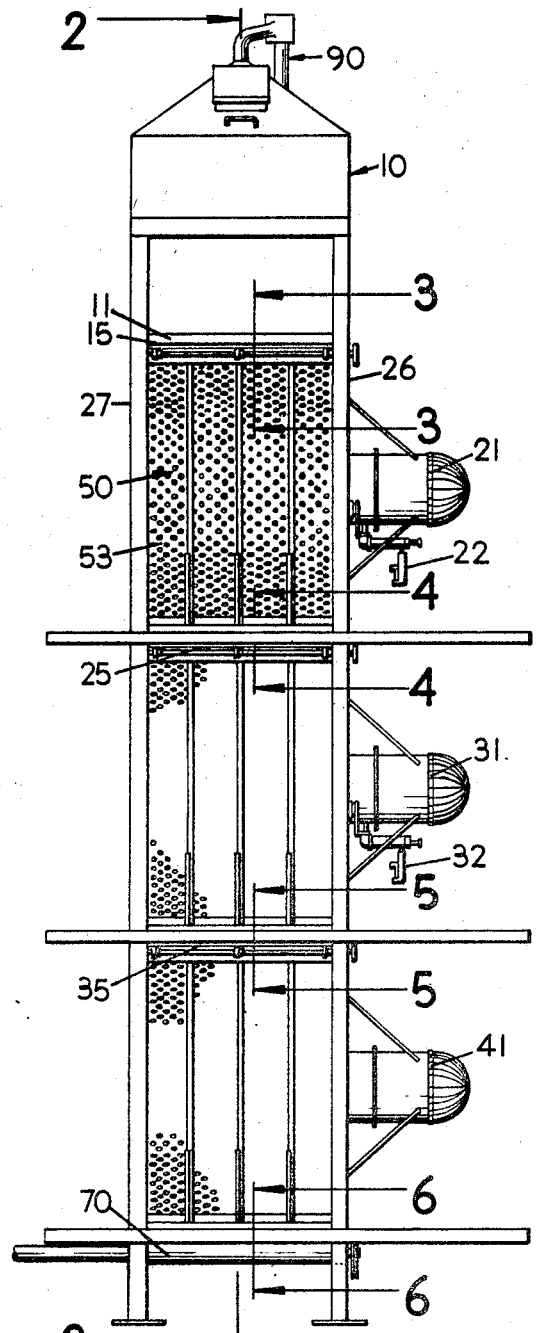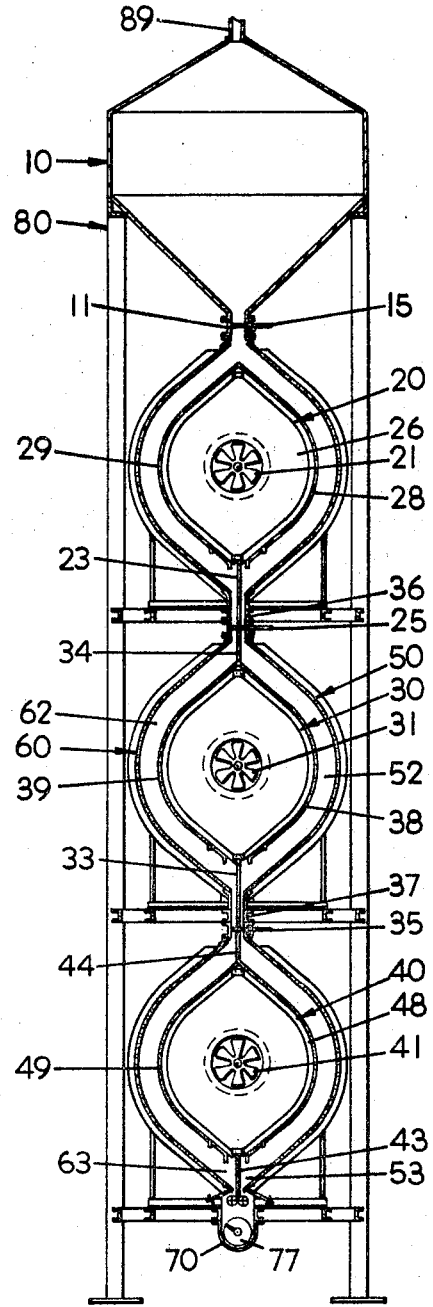

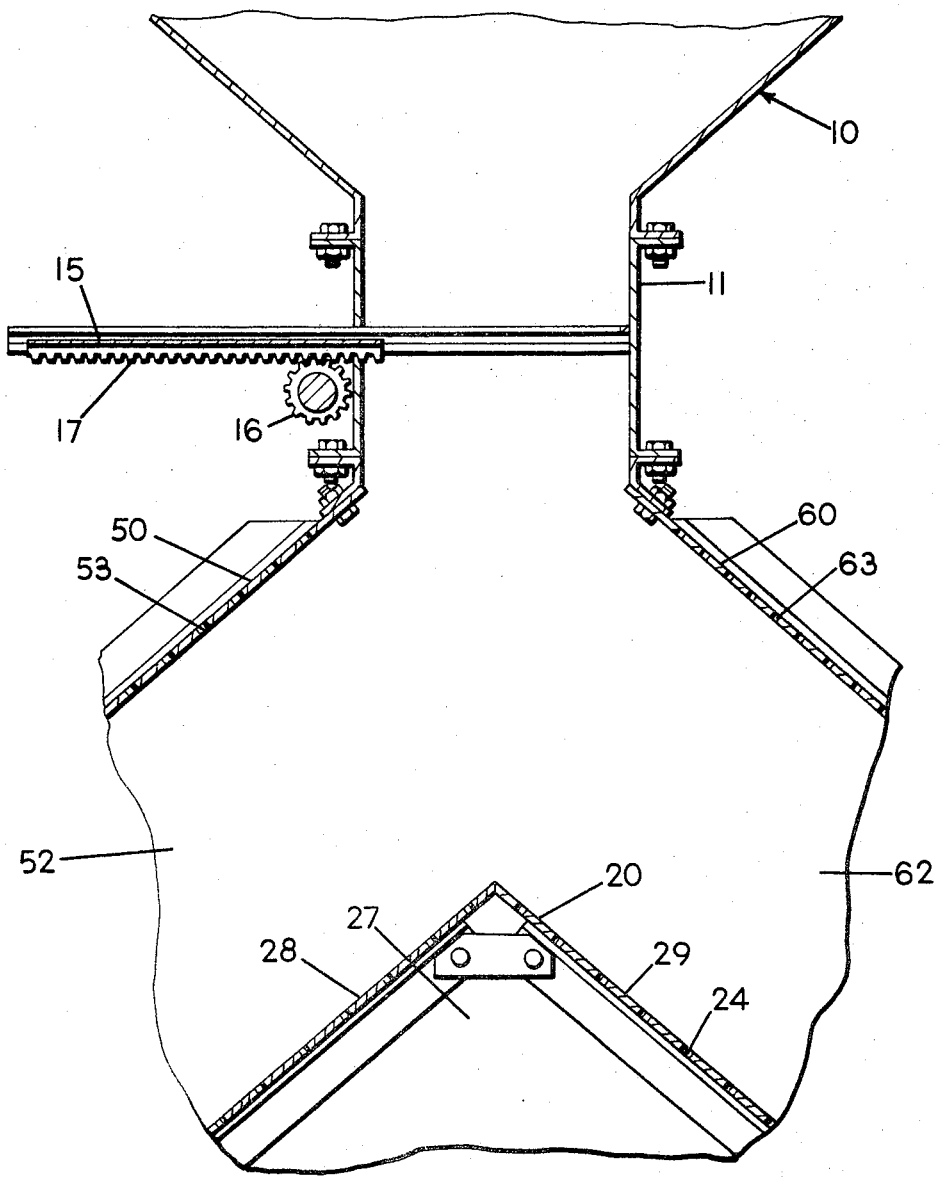

United States Patent Office 3,435,540
Patented Apr. 1, 1969

3,435,540
APPARATUS FOR AERATING LOOSE PARTICLES
Norman H. Sanders, Jr., and Raymond Sanders, Greenwich Township, Huron County, Ohio (both of Rte. 1, Greenwich, Ohio 44837)
Continuation of application Ser. No. 317,596, Oct. 21, 1963. This application Feb. 7, 1968, Ser. No. 703,791
Int. Cl. F26b *17/14*
U.S. Cl. 34—174                    6 Claims

ABSTRACT OF THE DISCLOSURE

An apparatus for drying grain particles including a plurality of vertically spaced separate air plenums having continuous columnar passages adjacent their outer peripheries in cascade fashion leading from a grain hopper above the uppermost plenum to a discharge bin below the lowermost plenum. A vertical passage of restricted cross-section intermediate the plenums connects the upper and lower passages adjacent upper and lower plenums so that grain passage therebetween is mixed and churned for better drying efficiency and uniformity. Conditioned air is forced through each of the plenums and its adjacent grain passages.

---

This is a continuation of our co-pending application Ser. No. 317,596, filed Oct. 21, 1963, now abandoned.

The invention which is disclosed herein, and illustrated in the appended drawings, relates generally to apparatus for processing masses of finely divided particles of matter so as to heat, aerate, and cool the material, and thereby reduce the moisture content of the particles at a uniform rate. More specifically, this invention relates to a device for continuously processing loose materials such as: egg shells, ground corn cobs, beans, whole coffee, corn, oats, wheat, barley, rice, maize, milo, flax seed, and broome seed, by way of specific example; to lower the moisture content of the material to a more desirable level.

Such devices of the prior art typically operate to contain particles being processed in a substantially stationary or static condition. Known devices expose the stationary particles to the passage of moving air. The air is heated at times, when desired, to increase its capacity to absorb moisture from the material.

The results achieved by such devices are unsatisfactory for several reasons. First, the time required to load, heat, cool and unload such machines renders them unavailable for material processing purposes during as much as one-third of the time they are in use. Secondly, materials in process are maintained in a relatively stationary condition during the aerating and drying process, with the result that the end product is less uniform than desired. This is due to the fact that the passage of air through quantities of stationary material, located at different positions within a batch, is not uniform in either volume or velocity.

Thus it is seen that the result achieved by previously known apparatus of this type is imperfect in that such devices are characteristically employed in non-productive functions much of the time, and the material processed thereby is often not of uniform quality.

Objects

One object of this invention is to provide an apparatus for continuously moving masses of loosely divided particles of material through processing zones where the particles are subjected to different atmospheric conditions as required for uniform heating, aeration, drying and cooling.

A second object of the present invention is to provide an apparatus for continuously moving loose particles through a variety of atmospheric conditions, wherein means is provided for exposing said particles to a single atmospheric condition during various periods of time, when desired.

A further object of the present invention is to provide an apparatus which may be employed for continuously processing large quantities of loose particles for an indefinite period of time, when desired and which may be employed at other times to process smaller quantities, or "batches" of such particles, having either similar or dissimilar characteristics, either separately, or consecutively in a continuous operation.

Still further objects and features of this invention will be apparent from the subjoined specification and claims, when they are considered together with the associated drawings.

Drawings

FIG. 1 is a view in side elevation, showing the preferred embodiment of the device of this invention, with associated access ladders and guard rails omitted for clarity of representation.

FIG. 2 is a view in vertical section taken along line 2—2 of FIG. 1, detail of the charging conveyor being omitted.

FIG. 3 is a fragmentary view in section, taken along the line 3—3 of FIG. 1, showing the hopper conduit and the upper portion of the pre-heater structure, on an enlarged scale.

Description

Figure 4:
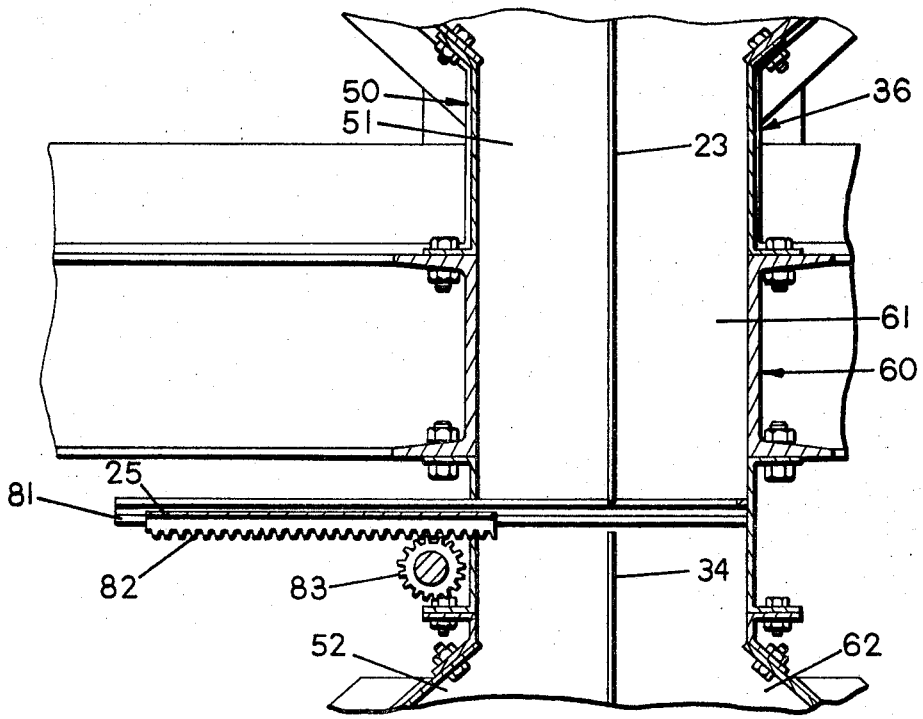
FIG. 4 is a fragmentary view in section, taken along line 4—4 of FIG. 1, showing the structure of the preheater outlet conduit and the associated slide gate, on a scale enlarged from FIG. 1.

In summary, the device of the present invention is seen in FIGS. 1 and 2 to be an apparatus for aerating loose particles of matter, comprising: a plurality of perforate plenums 20, 30 and 40; means comprising a perforate outer wall 50 disposed along adjacent sides 28, 38 and 48 of plenums 20, 30 and 40, for defining a passage 52 adapted for gravitational flow of particulate materials, located adjacent and between plenums 20, 30 and 40; means comprising fans 21, 31 and 41, for moving air under pressure through said plenums 20, 30 and 40, and through passage 52; means comprising heaters 22 and 32, for heating air, moved by fans 21 and 31 and plenums 20 and 30 through passage 52; means comprising divider baffles 23 and 34, secured between adjacent plenums 20 and 30, and divider baffles 33 and 44, secured between adjacent plenums 30 and 40, for defining restricted portions 51 and 55 (FIGS. 4 and 5), respectively, of passage 52, located intermediate plenums 20, 30 and 40; means comprising slide gates 25 and 35, for controlling gravitational movement of particles through passage 52; means comprising discharge chamber 70 (FIG. 6), for receiving particles discharged from passage 52; means comprising metering baffle 43, for guiding gravitational movement of said particles from passage 52 into receiving means or discharge chamber 70; means comprising metering roll 71 (FIG. 6), for discharging said particles from columnar passage 52 into receiving means 70; means comprising flow gates 73 and 74, for regulating movement of particles from passage 52 to the metering roll 71; means comprising conveyor 77, for discharging said particles from receiving means 70 at a determinable rate; means comprising surge bin 10 (FIG. 1) for containing said particles in position for gravitational movement into passage 62; means comprising hopper conduit 11, for conducting said particles from the surge bin 10 to passage 52; means comprising hopper control slide 15, for controlling gravitational movement of particles from the surge bin 10 into passage 52; and means comprising charging spout 89, and charging conveyor 90 for admitting unprocessed particles into surge bin 10.

Referring specifically to the drawings for a more detailed description of the device of this invention, it will be seen in FIGS. 1 and 2 that a plurality of plenums 20, 30 and 40 are spaced apart in substantial vertical alignment. Pre-heater plenum 20 is formed with oppositely disposed end walls 26 and 27. Lateral walls 28 and 29 of plenum 20 (FIG. 2) are preferably formed with an arcuate configuration; and are secured together by suitable means, along upper and lower margins. Lateral plenum walls 28 and 29 thus provide a substantially cylindrical overall configuration to plenum 20.

Lateral walls 28 and 29 are formed with perforations 24 (FIG. 3), which are sufficiently small that material being processed will not pass through them. Perforations 24 are spaced sufficiently close together to afford a maximum flow of air through walls 28 and 29, consistent with the load-bearing characteristics necessary for walls 28 and 29 to support and contain material in process.

Heater plenum 30 and cooler plenum 40 (FIG. 2) are preferably constructed substantially similar to pre-heater plenum 20, the structure of which is described in detail above.

Means for defining a passage 52 adapted for gravitational flow of particles in process, comprises outer perforate wall 50, located adjacent and between plenums 20, 30 and 40. Outer wall 50 is radially disposed about the mutually adjacent sides 28, 38 and 48 of plenums 20, 30 and 40, respectively; and is spaced from each of said sides a suitable distance. Wall 50 is secured along its opposite edges to the front and rear walls of said plenums. Outer wall 60 is similarly disposed about mutually adjacent plenum walls 29, 39 and 49, and is similarly secured to the front and rear plenum walls.

Outer walls 50 and 60 are arranged concentrically with, in substantial conformity to, and substantially coextensive of, each adjacent plenum wall. Thus it is seen that outer walls 50 and 60 cooperate with the forward, rear and lateral walls of each plenum for defining columnar passages 52 and 62, adapted for gravitational flow of particulate materials, which lie adjacent and extend along the opposite sides of plenums 20, 30 and 40.

In the area intermediate adjacent plenums 20 and 30, outer walls 50 and 60 are converged to form a particle transfer conduit portion 36 (FIG. 4) along passages 52 and 62. Outer walls 50 and 60 are similarly converged, in the area intermediate adjacent plenums 30 and 40, for forming a similar conduit portion 37 along opposite passages 52 and 62.

Particle transfer conduit portions or duct portions 36 and 37 are each formed with a cross-sectional configuration having an area not greater than that of either of columnar passages 52 or 62. This reduction of the total cross-sectional area of passages 52 and 62, at duct portions 36 and 37, serve to restrict the flow of particles in process from the zone of one plenum to the zone of the next succeeding plenum, in the direction of movement of particles through the apparatus. By thus impeding the rate of gravitational flow through the apparatus, the loose particles of material in process are caused to churn and mix as the material moves from the zone adjacent one plenum to the zone within each passage which lies adjacent the next succeeding plenum.

Outer walls 50 and 60 are further provided with perforations 53 and 63 (FIG. 3), which are substantially similar in character and arrangement to perforations 24 in plenum walls 28 and 29, previously described.

Means for moving air through each of plenums 20, 30 and 40 and through adjacent portions of columnar passages 52 and 62 preferably comprises fans 21, 31 and 41, each having relatively high air delivery characteristics. Fan 21 is located in end wall 26 of plenum 20 (FIG. 2) and operates to introduce air under pressure into the central cavity of plenum 20. Air delivered by fan 21 into plenum 20 passes through perforations 24 (FIG. 3) in walls 28 and 29, into those portions of columnar passages 52 and 62, lying adjacent plenum 20 which constitutes the pre-heater zones of the passages. Air which is thus introduced into passage 62 passes through the passage in a generally radial path from wall 29 of plenum 20, and is discharged from passage 62 through perforations 63 in outer wall 60. Similarly, air which passes from fan 21, through plenum 20 and perforations 24 in wall 28, moves radially across passage 52 and is discharged therefrom through perforations 53 of outer wall 50.

Means for heating air, which is thus moved through passages 52 and 62 from plenum 20, comprises a heater 22, which is capable of increasing the temperature of substantial quantities of moving air per unit of time. For example, oil or gas-fired heating units, of the "jet" variety, have been found capable of meeting the heat energy requirements of the present invention, in combination with a fan which is characterized by relatively high rate of air delivery.

Heater 22 is arranged adjacent fan 21 so as to substantially increase the temperature of the air, which is delivered by fan 21 to the internal cavity of plenum 20. Air which is thus heated by heating unit 22 is subsequently moved from plenum 20 through columnar passages 52 and 62, in the manner described above.

Means for defining a separate columnar passage within that portion of passage 52 between adjacent plenums 20 and 30, comprises divider baffles 23 and 34 (FIG. 2). Baffle 23 is rigidly secured along the lower edge of plenum 20, projects downwardly into pre-heater outlet duct 36, and is located intermediate opposite walls 50 and 60, within the upper portion of pre-heater outlet duct 36. Baffle 34 is rigidly secured along the upper edge of plenum 30 and projects upwardly into the lower portion of duct 36, intermediate oppositely disposed walls 50 and 60.

Baffles 23 and 24 serve to define separate material passage portions 51 and 61 (FIG. 4), within columnar passages 52 and 62, respectively, at pre-heater outlet duct 36. Baffles 23 and 34 serve to prevent the inter-mixture of particles which are moving downwardly through restricted throat 61 of columnar passage 62 with those particles which moves simultaneously through restricted throat 51 of columnar passage 52. Baffles 23 and 34 thus operate to assure rates of material flow, through passages 52 and 62, which are substantially uniform in character.

Baffle 33 is rigidly secured along the lower edge of plenum 30 and projects into heater outlet duct 37 (FIG. 5) in substantially the manner described above with reference to baffle 23. Baffle 44 is rigidly secured along the upper edge of plenum 40 (FIG. 2) and projects within duct 37, in substantially the same manner as baffle 34, discussed above. Baffles 33 and 44 serve to define separate material passage portions 55 and 65, within columnar passages 52 and 62, respectively, at heater outlet duct 37, substantially as previously described with reference to pre-heater outlet duct 36.

Experiments have taught that the cross-sectional area of restricted throats 51, 61, 55 and 65 should be not greater than one-half the cross-sectional area provided in the arcuate portions of either of columnar passages 52 and 62. This configuration causes processed materials to churn and mix while moving gravitationally through the throat portions of the columnar passages and assures that the processed materials will be uniformly exposed to the air which is passed through the apparatus by fans 21, 31 and 41.

Means for controlling gravitational movement of particles through pre-heater outlet duct portion 36 of passages 52 and 62, comprises slide gate 25 (FIG. 4) which is arranged transversely of duct 36 is slideable engagement with track 81. Slide gate 25 is repositionable along track 81, within a transverse plane of duct 36. Rack and pinion means 82 and 83 are provided for moving slide gate 25 either into or out of a position, within duct 36, wherein the gate serves to arrest gravitational flow of material in process, through portions 51 and 61 of the columnar passages.

Slide gate 35 (FIG. 5) is similarly located with reference to duct 37, and is repositionable across duct 37 by means of pinion 84, in mesh with rack 85, at times when it is desired to arrest the flow of material in process through restricted passage portions 55 and 65 of conduit 37.

Figure 6:
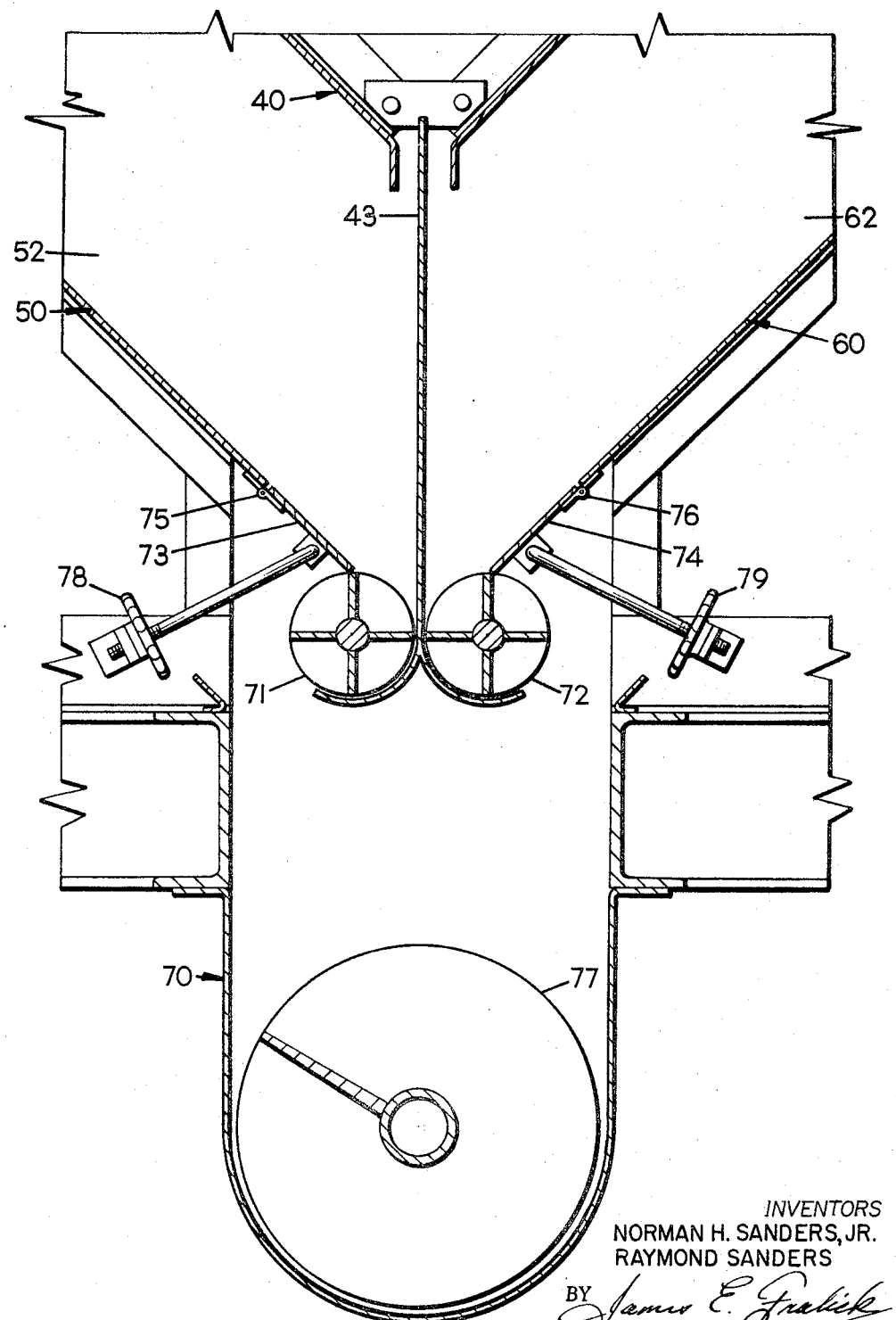
FIG. 6 is a view in section, taken along the lines 6—6 of FIG. 1, showing the lower termini of the columnar passages in association with the discharge bin.

Means for receiving particles which are discharged from passages 52 and 62, comprises discharge chamber 70, which is formed with the general cross-sectional configuration seen in FIG. 6. Discharge chamber 70 is located subjacent the lower termini of columnar passages 52 and 62.

Means for guiding the movement of particles from lower portion of passages 52 and 62, into the discharge chamber 70, comprises discharge baffle 43 (FIG. 6). Baffle 43 is rigidly secured along the lower edge of cooler plenum 40 and projects downwardly, intermediate the lower termini of walls 50 and 60. Baffle 43 serves to prevent the intermixture of materials, which are simultaneously processed through columnar passages 52 and 62.

Means for discharging particles of material in process, from columnar passage 52, comprises metering roll 71, which is rotatably secured above the discharge chamber 70. Roll 71 is arranged parallel with, and immediately adjacent, a plane surface of baffle 43. Metering roll 72 is similarly arranged, within passage 62, adjacent the opposite plane surface of baffle 43.

Means for regulating the rate of flow of material, from columnar passage 52 to metering roll 71 comprises flow gate 73 (FIG. 6), which is pivotally secured by a suitable hinge 75, along the lower margin of wall 50. A flow gate 74 is similarly secured by hinge 76 along the lower edge of wall 60.

Suitable adjusting screws 78 and 79 are provided for rotating flow gates 73 and 74, about their respective pivotal axes, to various positions of proximity with baffle 43. It will be apparent, from the illustration of FIG. 6, that when flow gate 74 is rotated about hinge 76 toward baffle 43, the interval between the inner edge of flow gate 74 and baffle 43 is restricted. Such adjustment of gate 74 serves to reduce the volume of material which is gravitationally discharged from passage 62 to metering roll 72, during a given period of time. Flow gate 73 operates, in a similar manner, to regulate the rate at which particles of processed material flow from passage 52 to metering roll 71.

Metering rolls 71 and 72 (FIG. 6) are rotated by suitable motor means, oppositely about their respective axes, for discharging particles from passages 52 and 62 into discharge chamber 70, at a determinable, measured rate, depending upon the positions of flow gates 73 and 74, and upon the speed at which the rolls 71 and 72 are counterrotated.

Means for removing processed material from discharge chamber 70, comprises a suitable conveyor 77 (FIG. 6), which is located within and extends longitudinally of bin 70. While a variety of types of conveyor means may be employed for this purpose, a conveyor of the screw type is preferred.

The apparatus of this invention is supported in the configuration of substantially vertical alignment which was previously described, by a suitable frame 80 (FIG. 2). Superposed upon frame 80, immediately above the upper termini of outer walls 50 and 60, is surge bin 10 for containing particles of material in position for gravitational movement into passages 52 and 62.

Surge bin 10 is preferably formed with the configuration seen in the drawings and has a volumetric particle capacity not less than that of those portions of columnar passages 62 and 52 which extend above pre-heater slide gate 25.

Means for conducting particles from surge bin 10 to passages 52 and 62, comprises hopper conduit 11 (FIG. 3), which is formed in the lower portion of surge bin 10. Means for controlling movement of particles from surge bin 10 to passages 52 and 62 comprises a hopper slide gate 15, which is repositionable within hopper conduit 11. Hopper control slide 15 is substantially similar in configuration and operation to slide gates 25 and 35 which were previously described. Slide 15 may be repositioned, within a plane extending transversely of conduit 11, by rotating pinion 16, in mesh with rack 17, which is secured to slide 15. When slide 15 is positioned outside conduit 11, material particles from surge bin 10 flow freely, in response to gravitational forces, through conduit 11 and into the upper portions of columnar passages 52 and 62. When slide 15 is positioned transversely within conduit 11, slide 15 serves effectively to block the flow of particles into passages 52 and 62.

Surge bin 10 is further formed, at its upper end, with a suitable charging spout 89. Material particles which are intended for processing by the apparatus are introduced into surge bin 10, through charging spout 89, by suitable conveyor means 90.

Operation

Figure 5:
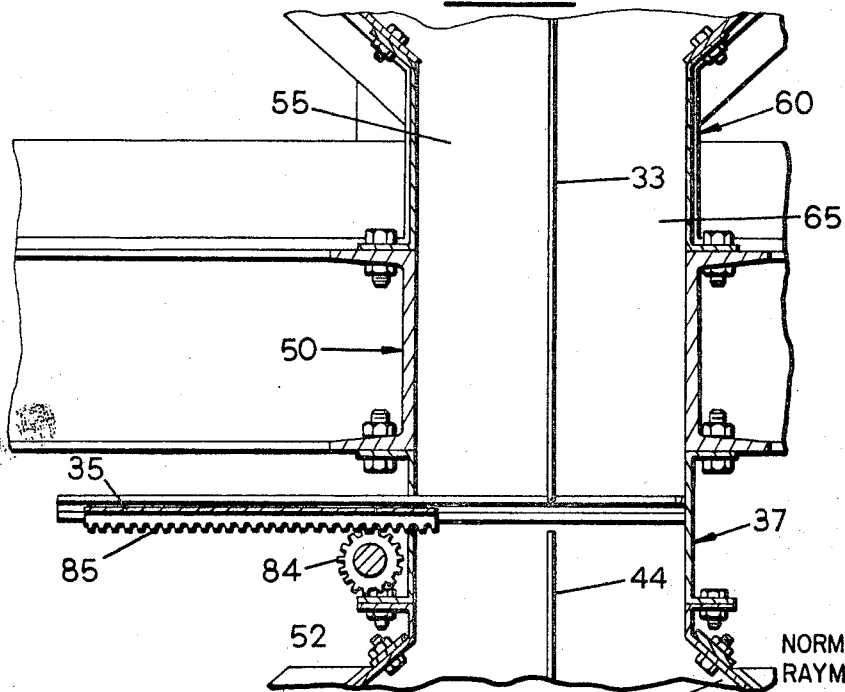
FIG. 5 is a similar view in section, taken along the lines 5—5 of FIG. 1; showing, on an enlarged scale, the heater outlet conduit and the slide structure associated therewith.

When the apparatus of this invention is employed for drying agricultural products, such as corn, for example; main heater slide gate 35 is repositioned from the location outside of conduit 38, seen in FIG. 5, to the closed position of gate 35, extending transversely across both restricted passages 55 and 65 within conduit 37. Slides 15 and 25 are maintained in their open positions, which are shown in FIGS. 3 and 4, respectively.

Grain which is to be processed is introduced into surge bin 10 by a suitable conveyor 90, through charging spout 89 (FIG. 2). Pre-heater fan 21 and main heater fan 31 are then started into continuous operation. Heating units 22 and 32 (FIG. 1) are also placed in operation, for heating the air delivered by fans 21 and 31 into the central cavities defined by plenums 20 and 30, respectively. Fan 21 moves air, heated by heating unit 22, through openings 24 (FIG. 3) in plenum walls 28 and 29, across columnar passages 62 and 52, and through openings 53 in outer wall 50 and openings 63 in outer wall 60.

Fan 31 (FIG. 2) delivers air, heated by heating unit 32 (FIG. 1) into the central cavity defined by plenum 30 (FIG. 2), through openings 24 in walls 38 and 39 of plenum 30, and through openings 53 and 63 in outer columnar passage walls 50 and 60, respectively.

After surge bin 10, and those portions of columnar passages 52 and 62 located adjacent and between pre-heater plenum 20 and heater plenum 30, are filled with grain to be processed, fans 21 and 31, and heaters 22 and 32, respectively (FIG. 1), are operated continuously for so long as it is desired to maintain the apparatus in continuous operation. Although the operation of heating units 22 and 32 may be intermittent, as compared with the constant fan operation, the heaters are controlled by suitable temperature sensing means for maintaining a substantially constant air temperature within plenums 20 and 30.

When the pre-heater and main heater zones of passages 52 and 62 are filled with grain, as described above, heated air from plenum 20 is moved radially through the masses of grain particles contained within the pre-heater zones of passages 52 and 62 which lie along the opposite sides 28 and 29, of pre-heater 20 (FIG. 2). In a similar manner, heated air from plenum 30 is moved radially through the masses of grain particles contained within the heater zones of passages 52 and 62, which lie along the opposite sides of main heater plenum 30.

When the grain, which is contained in the pre-heating and heating zones of passages 52 and 62, reaches the desired degree of dryness, heater outlet slide 35 is then moved to the open position, shown in FIG. 5. When heater slide gate 35 is moved to the open position, grain particles, contained in the heater zones of passages 52 and 62 (FIG. 2), flow gravitationally through restricted throats 55 and 65 (FIG. 4) and are churned and mixed therein while passing from the heating zones to the cooling zones, of passages 52 and 62, adjacent cooling plenum 40.

After the cooling zones of columns 52 and 62 are thus filled with grain from the main heating zones; fan 41 is placed in operation for supplying air under pressure to the central cavity defined by plenum 40. Unheated air is moved by fan 41 into the central cavity of plenum 40, through openings 24 in the lateral walls 48 and 49 of plenum 40, across the cooling zones of columnar passages 52 and 62, lying along opposite sides of plenum 40, and through openings 53 and 63 in outer walls 50 and 60, to the outside atmosphere.

When grain from the heating zone has filled the cooling zone of columnar passages 52 and 62, adjacent cooling plenum 40 (FIG. 2), the grain previously located in the pre-heating zones of the columnar passages will have descended through restricted throats 51 and 61 (FIG. 4), into the heating zones of passages 52 and 62 adjacent heater plenum 30. Grain particles which pass from the pre-heating zones of the columnar passages are replaced therein by unprocessed particles which descend gravitationally from surge bin 10 (FIG. 2), through hopper conduit 11, and into the pre-heating zones of columnar passages 52 and 62, adjacent pre-heating plenum 20.

When grain from the heating zone has filled the cooling weight) of the processed grain is attained in the grain in process, contained in the pre-heating zones of passages 52 and 62, metering rolls 71 and 72 are started in operation for discharging processed grain from the cooling zones of passages 52 and 62. When particles are discharged by metering rolls 71 and 72 into discharge chamber 70, conveyor 77 is started in operation for discharging grain from chamber 70.

From this point the apparatus may be maintained in continuous operation. The apparatus will continue to process grain particles at a constant rate, which is determined by the speed of rotation of metering rolls 71 and 72, for so long as unprocessed grain is supplied to surge bin 10 and will deliver processed grain having substantially uniform water content characteristics.

As grain is discharged from columnar passages 52 and 62, by metering rolls 71 and 72 and screw conveyor 77 (FIG. 6); it is replaced, in the cooling zones of the oppositely disposed passages, by dried grain which is discharged gravitationally from the heating zones through restricted passages 55 and 65 of heater discharge conduit 37 (FIG. 5). As the grain moves downwardly, through the main heating zones adjacent heater plenum 30, it is replaced by grain passing from the pre-heating zones through passages 51 and 61 of pre-heater discharge conduit 36 (FIG. 4).

As grain is processed in the pre-heating zones and moves downward, gravitationally, for further processing in the main heating zones, it is replaced by unprocessed grain, flowing gravitationally from surge bin 10 (FIG. 2), through hopper conduit 11 and into the upper portions of columnar passages 52 and 62.

Suitable conveyor means 90 is employed for introducing unprocessed particles, through charging spout 89, into surge bin 10, at a rate which will maintain a reasonably constant level of unprocessed material in surge bin 10, during continuous operation of the apparatus.

The restricted passage defined by hopper conduit 11, causes the passage of grain through conduit 11 to be occasioned by considerable mixing and churning of particles which pass through the passage. This feature assures that homogeneous mixture of unprocessed grain will be supplied for processing to columnar passages 52 and 62. The arcuate path of gravitational flow of grain past plenum 20 causes further mixing of grain particles in process; as they descend gravitationally through opposite passages 52 and 62 and replace processed grain, which is discharged from the apparatus by metering rolls 71 and 72 and conveyor 77.

When it is desired to process an individual batch of loose particles, having a total volume which is in excess of the volumetric capacity of the pre-heating portions of passages 52 and 62, but is less than the capacity of those portions of opposite passages 52 and 62 extending above heater output slide gate 35; the apparatus is utilized in the following manner. Slide gate 25 is closed, and fan 21 and heater 22 are placed in operation, after the particles to be processed are introduced, in the manner previously described, into the pre-heating zones of passages 52 and 62. When approximately one-half of the excess moisture has been removed from the batch of particles, heater output silde gate 35 may be closed and pre-heater output slide gate 25 may be moved to the open position of FIG. 4. The particles then descend, through conduit 36, into the heating zone of passages 52 and 62. Fan 31 and heater 32 are then started in operation. The remaining excess moisture is then removed from the batch substantially in the manner described above.

Transfer of the particles, during the drying phase of the processing cycle, serves to mix and churn the particles as they pass through restricted throats 51 and 61 of conduit 36 (FIG. 4). This step in the process serves to reorient the particles, with reference to an operational plenum, during the latter half of the heating and the drying phase of the process. Thus, the retention of isolated masses of processed material, in relatively fast or slow drying regions of the apparatus, is avoided. This feature of the present invention accomplishes a result not attainable by known batch-processing devices which maintain particles in process in substantially the same relative positions throughout the drying phase of a processing cycle.

When an individual batch of grain attains the desired moisture content, slide gate 35 is repositioned to the open position, seen in FIG. 5. The grain then flows, gravitationally, from the heating zones of oppositely disposed passages 52 and 62, into the cooling zones thereof, adjacent plenum 40. The grain particles are preferably retained within the cooling zones until the temperature of the particles is reduced to that of the outside air. Experiments indicate that the cooling phase of the operation cycle may require a period of time equal to approximately one-half the total time which is required to achieve the desired moisture content by exposure to heating and aeration in the pre-heating and heating zones, as described above. At the end of the cooling period, metering rolls 71 and 72 and screw conveyor 77 are placed in operation to remove the batch of particles from the apparatus.

It is readily seen that a successive batch of material may be started in process, in the pre-heating zones of passages 52 and 62, with slide gate 25 in the closed position, during the period of time required for processing a preceding batch in the heating and cooling zones of passages 52 and 62 of the apparatus.

If a batch of particles is equal in volume to the combined volumetric capacity of the pre-heating and main heating zones of passages 52 and 62; the batch may, if desired, be processed as though the apparatus were being started in continuous operation, substantially as described above.

It is to be understood that the above embodiment of this invention is shown and described herein for purposes of illustration only. Various changes may be made therein without departing from the spirit and scope of the invention.

We claim:

1. An apparatus for drying grain particles, comprising: a plurality of perforate plenums, arranged in substantially vertical, spaced alignment; means, comprising a plurality of fans, for introducing air under pressure into said plenums; means, comprising a heater, for heating air delivered by at least one of said fans; means, comprising a perforate outer wall, disposed along adjacent sides of said plenums, for defining a columnar passage for gravitational flow of said particles, adjacent and between said plenums; means, comprising a divider baffle, secured between adjacent plenums, for defining separate particle passages intermediate said plenums; means, comprising a slide gate, for controlling the flow of said particles intermediate said plenums; means, comprising a surge bin, formed with an outlet conduit, in fluid communication with said columnar passage adjacent one of said plenums, for containing said particles in position for gravitational flow into said columnar passage; means, comprising a hopper control slide, for controlling the flow of particles from said surge bin into said columnar passage; means, comprising a discharge chamber, for receiving particles discharged from said columnar passage; means, comprising a metering baffle, secured to one of said plenums and projecting toward said receiving means, for guiding the flow of said particles from said columnar passage into said receiving means; means, comprising a metering roll, for discharging said particles from said columnar passage into said receiving means; means, comprising a flow gate, pivotally connected to said outer wall and rotatable to a position adjacent said metering baffle, for regulating the movement of said particles from said columnar passage to said metering roll; means, comprising a discharge conveyor, for removing said particles from said receiving means; means, comprising a charging conveyor, for supplying said particles to said surge bin; and means, comprising a frame, for supporting said apparatus in said substantially vertical alignment.

2. An apparatus for treating grain particles, comprising: a plurality of perforate plenums arranged in substantially vertical, spaced alignment, means comprising at least one fan for introducing air under pressure into said plenums, means comprising at least one heater for heating air delivered by said fan, means comprising a perforate outer wall disposed along adjacent sides of said plenums for defining a columnar passage for gravitational flow of said particles adjacent and between said plenums, means comprising a divider baffle secured between adjacent plenums to define separate particle passages intermediate said plenums, means comprising a slide gate for controlling the flow of said particles intermediate said plenums, means comprising a surge bin formed with an outlet conduit in fluid communication with said columnar passage adjacent one of said plenums for containing said particles in position for gravitational flow into said columnar passage, means comprising a hopper control slide for controlling the flow of particles from said surge bin into said columnar passage, means comprising a discharge chamber for receiving particles discharged from said columnar passage, means comprising a metering baffle secured to one of said plenums and projecting toward said discharge chamber for guiding the flow of said particles from said columnar passage into said discharge chamber, means comprising a metering roll for discharging said particles from said columnar passage into said discharge chamber, means comprising a flow gate pivotally connected to said outer wall and rotatable to a position adjacent said metering baffle to regulate the movement of said particles from said columnar passage to said metering roll, means comprising a discharge conveyor for removing said particles from said discharge chamber, means comprising a charging conveyor for supplying said particles to said surge bin, and means comprising a frame for supporting said apparatus in said substantially vertical alignment.

3. Apparatus for treating loose particles comprising: a plurality of separate air plenums formed with perforate lateral walls disposed radially outwardly from vertically spaced horizontal axes, means comprising a plurality of perforate outer walls concentrically disposed outwardly of said lateral walls to define therewith oppositely disposed particle passages adjacent each of said plenums, means comprising at least one fan associated with said plenums for moving air under pressure through said plenums and across said passages, means for heating air moving through said passages from said fan, duct portions located vertically intermediate said plenums and secured to and connecting the adjacent outer perforate walls and defining restricted passages interconnecting said passages adjacent an upper plenum to said passages adjacent a lower plenum for mixing and churning particles passing therebetween, means for receiving particles discharged from said passages, means for discharging said particles from said passages, and means for regulating movement of said particles from said passages to said discharging means.

4. The apparatus of claim 7 wherein each of the duct portions for mixing and churning said particles intermediate said plenums further includes a vertical divider baffle secured between said plenums and arranged centrally of said duct portions.

5. The apparatus of claim 3, wherein said restricted particle passages located intermediate said plenums are formed with a cross-sectional area not greater than one-half the cross-sectional area of said passage located adjacent a superposed plenum.

6. Apparatus for treating loose particles, comprising: a plurality of separate air plenums having vertically spaced apart horizontal axes and formed with opposite end walls arranged transversely of the plane of said axes, each of said plenums further including a plurality of perforate lateral walls disposed radially outwardly from one of said axes, a divider baffle located intermediate adjacent plenums and secured thereto, means comprising a pair of perforate outer walls arranged outwardly of and in substantial conformity with said lateral plenum walls and secured to said end walls so as to define oppositely disposed gravitational passages for said particles intermediate said perforate outer walls and said perforate lateral plenum walls, means comprising vertical portions of said outer walls located intermediate said plenums arranged in spaced relationship with said divider baffle to define oppositely disposed particle transfer conduits of substantially restricted cross-sectional configuration along said particle passages, for mixing and churning said particles during gravitational movement of particles intermediate said plenums, means comprising at least one fan located in an end wall of said plenums for moving air through said plenums and through particles contained in adjacent particle passages, means associate with said fan for heating said air moved thereby, and means for discharging said particles from said gravitational passages at determinable rates.

References Cited

UNITED STATES PATENTS

| 1,014,122 | 1/1912 | Cornwall | 34—171 |
| 1,155,402 | 10/1915 | Bornmann | 34—171 |
| 2,654,590 | 10/1953 | Molenaar | 34—171 |
| 2,706,345 | 4/1955 | Arndt | 34—174 |
| 2,941,310 | 6/1960 | Schaub | 34—174 |
| 3,053,522 | 9/1962 | Applegate | 34—174 |
| 3,233,337 | 2/1966 | Tomlinson | 34—174 |

FOREIGN PATENTS

| 490,629 | 5/1928 | Germany. |
| 598,456 | 5/1960 | Canada. |
| 813,242 | 5/1959 | Great Britain. |

FREDERICK L. MATTESON, JR., *Primary Examiner.*

H. B. RAMEY, *Assistant Examiner.*

UNITED STATES PATENT OFFICE
CERTIFICATE OF CORRECTION

Patent No. 3,435,540　　　　　　　　　　　　　　　　April 1, 1969

Norman H. Sanders, Jr., et al.

It is certified that error appears in the above identified patent and that said Letters Patent are hereby corrected as shown below:

Column 7, line 34, cancel "When grain from the heating zone has filled cooling" and insert -- When the desired water content analysis (determined by --. Column 10, line 19, the claim reference numeral "7" should read -- 2 --.

Signed and sealed this 7th day of April 1970.

(SEAL)
Attest:

Edward M. Fletcher, Jr.
Attesting Officer

WILLIAM E. SCHUYLER,
Commissioner of Pate